(12) United States Patent
Horaguchi

(10) Patent No.: US 7,609,420 B2
(45) Date of Patent: Oct. 27, 2009

(54) LOCK MECHANISM FOR A MOVABLE UNIT, A POSITION SENSOR, A METHOD OF SETTING THE MOVABLE UNIT, AND AN IMAGE READING APPARATUS

(75) Inventor: Yoichi Horaguchi, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1043 days.

(21) Appl. No.: 10/743,044

(22) Filed: Dec. 23, 2003

(65) Prior Publication Data

US 2004/0136036 A1   Jul. 15, 2004

(30) Foreign Application Priority Data

Dec. 27, 2002   (JP)   ............... 2002-380929

(51) Int. Cl.
*H04N 1/04* (2006.01)
(52) U.S. Cl. .................. 358/474; 358/497; 358/486; 399/367; 399/372; 271/3.01
(58) Field of Classification Search .................. 358/474, 358/498, 497, 501, 486, 514, 488; 399/367, 399/252, 346, 159, 361, 372, 211; 271/161, 271/114, 3.01
See application file for complete search history.

(56) References Cited

U.S. PATENT DOCUMENTS

| | | | | |
|---|---|---|---|---|
| 5,453,850 A | * | 9/1995 | Akuzawa et al. | ............ 358/475 |
| 5,754,314 A | * | 5/1998 | Araki et al. | .................. 358/487 |
| 5,933,248 A | * | 8/1999 | Hirata | ......................... 358/406 |
| 6,043,908 A | * | 3/2000 | Takeuchi | ..................... 358/496 |
| 6,373,599 B1 | * | 4/2002 | Yamamoto et al. | .......... 358/474 |
| 6,765,700 B1 | * | 7/2004 | Naito et al. | .................. 358/486 |
| 6,937,368 B2 | * | 8/2005 | Liu | ............................. 358/474 |
| 7,133,145 B2 | * | 11/2006 | White et al. | ................ 358/1.14 |
| 7,170,654 B2 | * | 1/2007 | Sawada | ....................... 358/483 |
| 7,295,352 B2 | * | 11/2007 | Hooper et al. | .............. 358/474 |
| 2003/0095296 A1 | * | 5/2003 | Terashima et al. | .......... 358/498 |
| 2008/0239414 A1 | * | 10/2008 | Misu | .......................... 358/498 |

FOREIGN PATENT DOCUMENTS

| JP | U 63-198056 | 12/1988 |
|---|---|---|
| JP | U 63-198057 | 12/1988 |
| JP | Y2 6-45954 | 11/1994 |
| JP | B2 2776185 | 5/1998 |
| JP | A 11-64999 | 3/1999 |

* cited by examiner

*Primary Examiner*—Houshang Safaipour
*Assistant Examiner*—Negussie Worku
(74) *Attorney, Agent, or Firm*—Oliff & Berridge, PLC

(57) ABSTRACT

An image reading apparatus having a movable image reading unit, a locking mechanism locking the image reading device, and a position sensor. The image reading unit has an engaged portion. The lock mechanism has an engaging portion that engages the engaged portion. A first detected portion changes its position in accordance with the movement of the engaging portion. The position sensor detects the image reading unit when the image reading unit is in a first position, and detects the first detected portion when the engaging portion engages with the engaged portion.

18 Claims, 12 Drawing Sheets

LOCK MECHANISM FOR A MOVABLE UNIT, A POSITION SENSOR, A METHOD OF SETTING THE MOVABLE UNIT, AND AN IMAGE READING APPARATUS

BACKGROUND OF THE INVENTION

1. Field of Invention

The invention relates to a lock mechanism that locks a movable unit, a position sensor that detects an initial position of a movable unit, an image reading apparatus that includes a lock mechanism and a position sensor, and a method for setting a movable unit to an initial state.

2. Description of Related Art

A known image reading apparatus includes a movable image reading unit and fixes the unit to the main body thereof to prevent accidents due to a movement of the unit when being transported, is disclosed, for example, in the Japanese Laid-Open Utility Model Publication No. 63-198056.

The image reading apparatus fixes the image reading unit when being transported. If the image reading apparatus is used while the unit is fixed, problems may result. To ensure that the unit is unfixed when the image reading apparatus is used, the image reading apparatus normally includes a sensor that detects the fixed state of the unit and prevents the unit from moving when the sensor determines that the unit is fixed.

SUMMARY OF THE INVENTION

The image reading apparatus described above needs extra space for the sensor, that detects fixed state of the movable unit, which leads to an increase in the manufacturing cost.

It is therefore an object of the invention to reduce the size of, and the manufacturing cost of, an apparatus including a function for fixing a movable unit when being transported.

According to the invention, there is provided an image reading apparatus having an movable image reading unit, a locking mechanism locking the image reading device, and a position sensor. The image reading unit has an engaged portion. The lock mechanism has an engaging portion engaging with the engaged portion, and a first detected portion that changes its position in accordance with the movement of the engaging portion. The position sensor detects the image reading unit when the image reading unit is in a first position, and detects the first detected portion when the engaging portion engages with the engaged portion.

In the above-described apparatus, it is possible to fix the image reading unit securely and possible to detect both the position and a fixed, or locked, state of the image reading unit with one sensor. Therefore, it is possible to reduce manufacturing costs in comparison with a case where two individual sensors for the first position and the fixed state of the movable unit respectively are mounted on the apparatus.

Also, according to the invention, there is a lock mechanism provided in an apparatus having an movable image reading unit and a position sensor. The image reading unit has an engaged portion. The position sensor detects the image reading unit when the image reading unit is in a first position. The lock mechanism has an engaging portion engaging with the engaged portion and a first detected portion changing its position in accordance with the movement of the engaging portion. The first detected portion is detected by the position sensor when the engaging portion engages with the engaged portion.

By structuring the lock mechanism for fixing the movable unit such that the lock mechanism includes the first detected portion, and the sensor is capable of detecting the first detected portion when the lock mechanism locks the movable unit as described above, it is possible to reduce manufacturing costs because the sensor can detect both the first detected portion and the image reading unit. Therefore two individual sensors are not needed for detecting the first position and the fixed state respectively.

Further, according to the invention, there is provided a position sensor that is used for an apparatus having a movable unit and a lock mechanism. The movable unit is provided movably in the apparatus. The lock mechanism fixes the movable unit in a fixed, or locked, position. The lock mechanism has a first detected portion that changes its position in accordance with the fixing movement of the lock mechanism. The position sensor has means for detecting the movable unit when the movable unit is in a first position that is different from the fixed position and detects the first detected portion when the movable unit is fixed in the fixed position.

With the position sensor described above, it is possible to detect both the position and a fixed state of the movable unit. Moreover, by mounting the position sensor on the apparatus, it is possible to reduce manufacturing costs in comparison with a case where two individual sensors, for the first position and the fixed state of the movable unit respectively, are mounted on the apparatus.

In addition, according to the invention, there is provided a method for detecting a fixed state of a movable unit with the position sensor described above and setting the movable unit to an initial state where the movable unit can move. The method includes a first step for judging whether either the movable unit or the first detected portion is detected by the position sensor, a second step for notifying that the movable unit should be unfixed by the lock mechanism when it is determined in the first step that either the first movable unit or the first detected portion is detected by the position sensor, a third step for judging whether either the movable unit or the first detected portion is detected by the position sensor after the notification in the second step, a fourth step for judging whether a command to move the movable unit is received when it is determined in the third step that either the movable unit or the first detected portion is detected by the position sensor, a fifth step for moving the movable unit when it is determined in the fourth step that the command is received, and a sixth step for judging whether either the movable unit or the first detected portion is detected by the position sensor after moving the movable unit in the fifth step. The third step and the fourth step are alternately repeated when it is determined in the third step that either the movable unit or the first detected portion is detected by the position sensor and when it is determined in the fourth step that the command is not received. The movable unit is initialized when it is determined that either the movable unit or the first detected portion is not detected by the position sensor in the first step, the third step, or the sixth step.

When the position sensor detects either the first position or the fixed state of the movable unit, it cannot be judged which of the position or the fixed state of the movable unit is detected. In the above-described method for setting the movable unit to the initial state, when the position sensor detects either the movable unit or the first detected portion in the first step, by requesting a user to unfix, or release, the movable unit (in the second step), or by moving the movable unit (in the fifth step), the movable unit or the first detected portion is moved to a place where either the movable unit or the first detected portion is not detected, and then the movable unit is initialized. Thus, the method sets the movable unit to an initial state where the movable unit can move. The initialization described here means moving the movable unit to a predetermined position or measuring an amount of reflected light as a reference value if the movable unit is an image reading unit.

BRIEF DESCRIPTION OF THE DRAWINGS

The invention will be described with reference to the drawings, in which.

DETAILED DESCRIPTION OF PREFERRED EMBODIMENTS

The embodiment is an example of the invention applied to a multi-functional apparatus with the functions of a printer, a copier, and a scanner. The general configuration of the multi-functional apparatus will be described with reference to FIG. 1.

Figure 1:
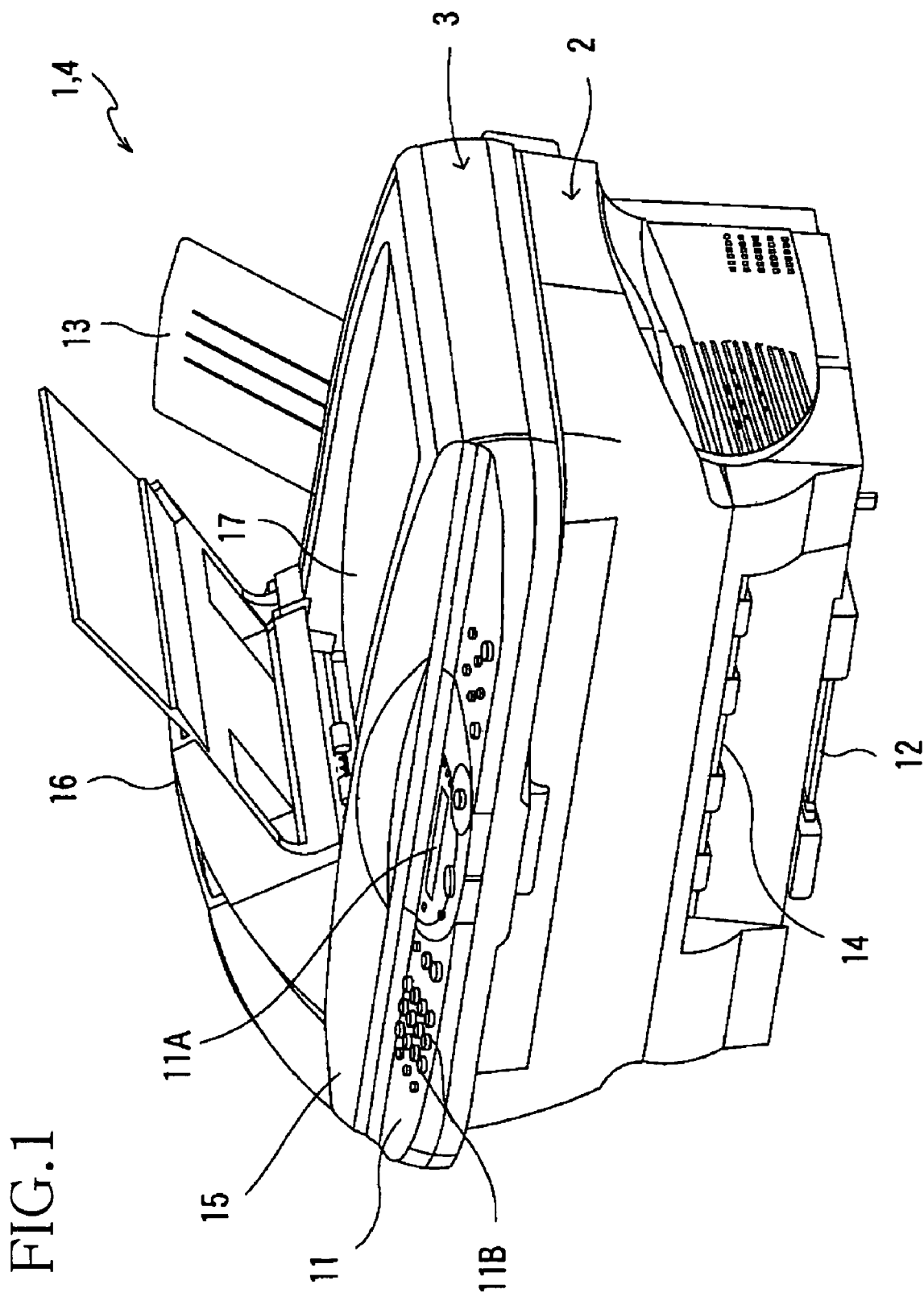
FIG. 1 is a perspective view of a multi-functional apparatus according to an embodiment of the invention.

As shown in FIG. 1, a multi-functional apparatus 1 is structured such that it includes a printer 2 positioned at a lower part thereof, a scanner 3 (that corresponds to the image forming apparatus in the invention) positioned at an upper part thereof, and a sheet supply device (not shown) positioned on a backside thereof. A control panel 11 is provided on an upper part of a front side of the multi-functional apparatus 1. The control panel includes a LCD (Liquid Crystal Display) 11A and a plurality of keys 11B. A discharge tray 12 is housed in a lower part of the front side of the multi-functional apparatus 1.

The sheet supply device includes an inclined-wall section 13 for supporting a plurality of sheets in an inclined posture. A sheet supply motor (not shown), a sheet supply roller (not shown), and the like are built into the inclined-wall section 13. As the sheet supply roller rotates, due to a driving force of the sheet supply motor, the rotating sheet supply roller feeds a sheet into the printer 2. A sheet on which an image has been printed by the printer 2 is discharged from a discharge opening 14 provided in the front side of the multi-functional apparatus 1. The discharge tray 12 is drawn out, if needed, to support sheets to be discharged from the discharge opening 14.

A document base cover 15 is provided on the upper part of the multi-functional apparatus 1. The document base cover 15 is supported by hinges 10 (not shown in FIG. 1, see FIG. 2) disposed at a rear part of the multi functional apparatus 1 so as to be pivotable therearound upward.

Figure 2:
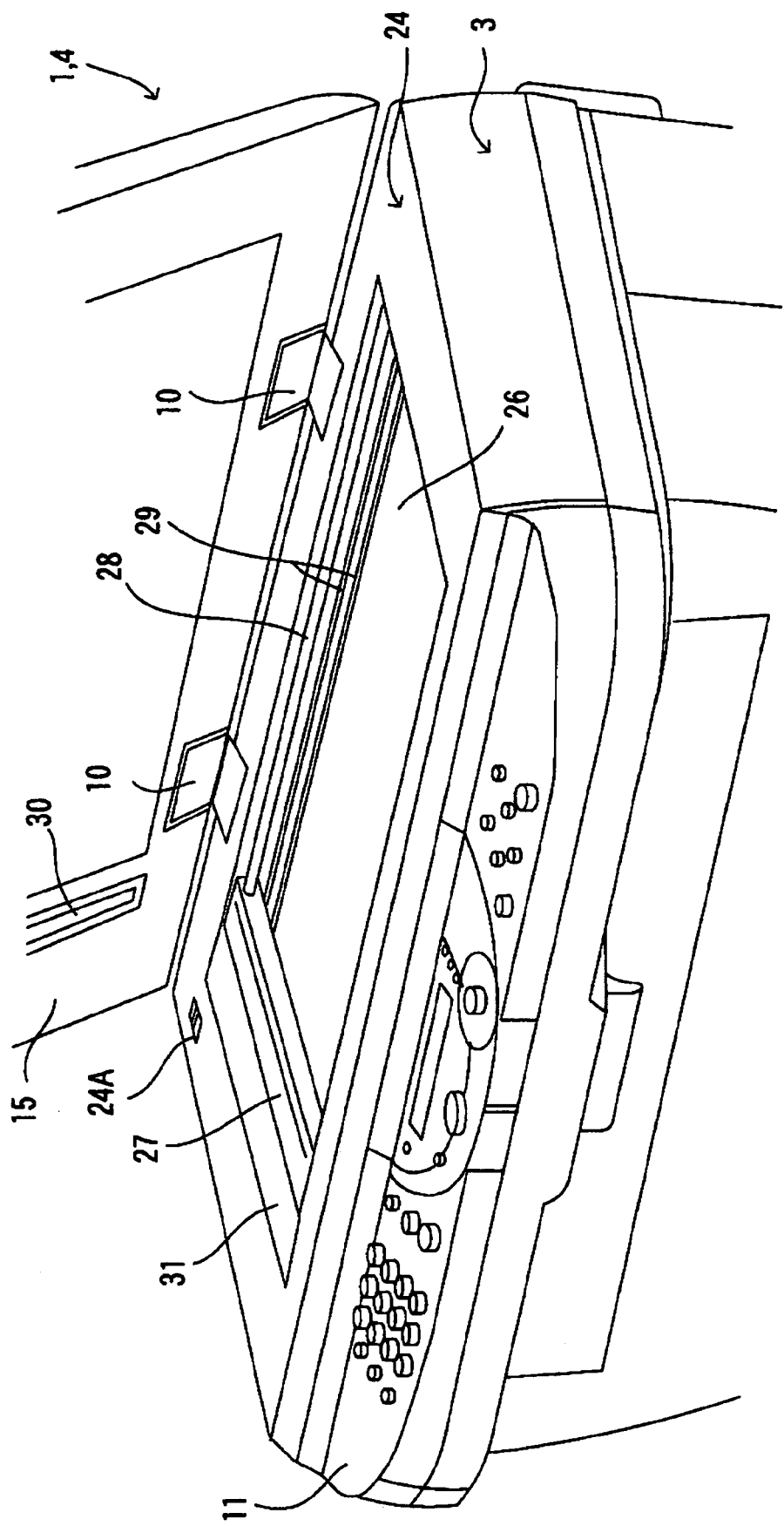
FIG. 2 is a perspective view of the multi-functional apparatus with its document base cover opened.

Next, the scanner 3 will be described with reference to FIG. 2. FIG. 2 is a perspective view of the multi-functional apparatus 1 with its document base cover 15 opened. In FIG. 2, the scanner is a flat bed type, and is structured such that it reads an image from a document placed on a platen glass 26 provided in a document base 24, with a line-type CCD (Charge-Coupled Device) unit 27 (that corresponds to the movable unit or image reading unit in the invention).

Figure 10A:
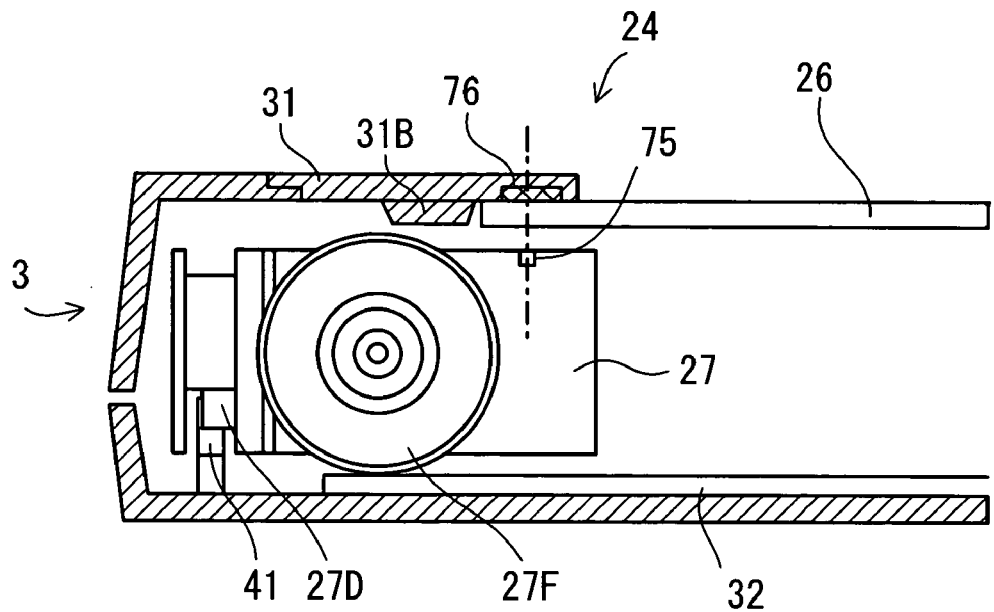
FIGS. 10(A) and 10(B) are perspective views of the inside of the scanner seen from the front side of the multi-functional apparatus.
Figure 10B:
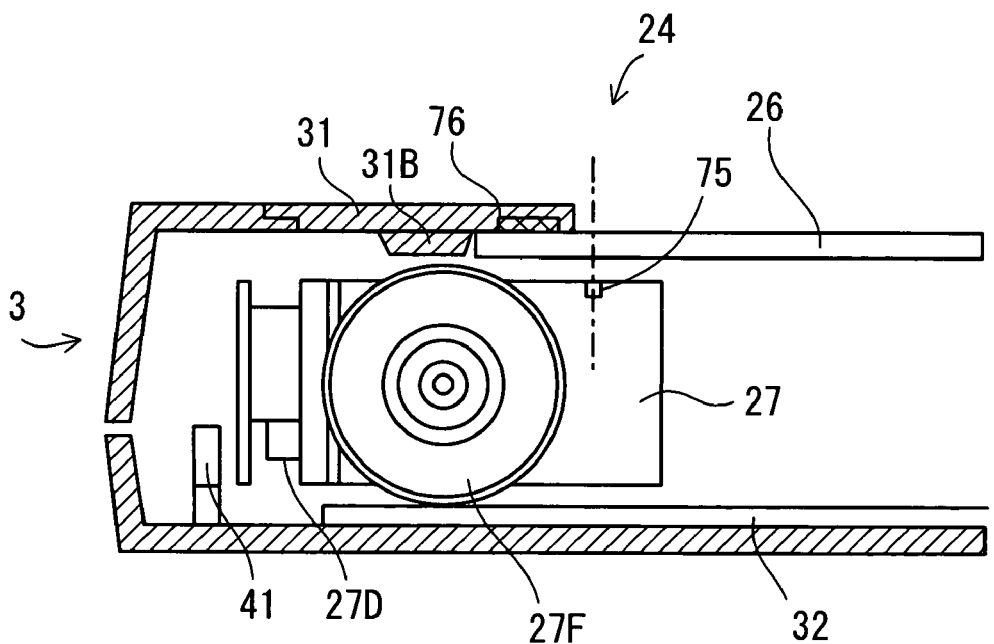

A guide shaft 28 is inserted though one end part of the CCD unit 27, and a guide rail 32 (not shown in FIG. 2, see FIGS. 10(A) and 10(B)) supports the other end part. When a drive motor 70 (not shown in FIG. 2, see FIG. 8) drives a belt 29 via gear mechanism (not shown), the CCD unit 27 moves along the platen glass 26 in accordance with a movement of the belt 29.

An ADF (Automatic Document Feed) mechanism 16 (see FIG. 1) is provided at a left side of an upper part of the document base cover 15. The ADF mechanism 16 is provided for successively reading images from documents without moving the CCD unit 27. More specifically, the ADF mechanism 16 feeds documents one by one to a document path portion 30, which is positioned above the CCD unit 27 when the document base cover 15 is closed, and discharges the documents to a document discharge tray 17. While the documents pass through the document path portion 30, the CCD unit 27 reads images from the documents without moving.

A detachable maintenance cover 31 is provided to the left of the platen glass 26 provided in the document base 24. By detaching the maintenance cover 31, it is possible to perform a cleaning or to replace parts easily. A shock absorbing protrusion 31B (not shown in FIG. 2, see FIG. 10) and a reference white board 76 described later (not shown in FIG. 2, see FIG. 10) are provided on a underside of the maintenance cover 31. The shock absorbing protrusion 31B restricts a vertical movement of the CCD unit 27 during a transportation of the multi-functional apparatus 1. The shock absorbing protrusion 31B also prevents the CCD unit 27 from being damaged by bumping into a plastic wheel 27F described later.

An operation opening 24A is formed in one end part of the document base 24. It is possible to access an operation portion 43A (not shown in FIG. 2, see FIG. 3) of an unit fixing device 42 (corresponds to the lock mechanism in the invention, not shown in FIG. 2, see FIG. 3) through the operation opening 24A and possible to change a position of the operation portion 43A.

A position sensor 41 (not shown in FIG. 2, see FIG. 3) for detecting a position of the CCD unit 27 is arranged fixedly at a predetermined position inside the document base 24.

Figure 3:
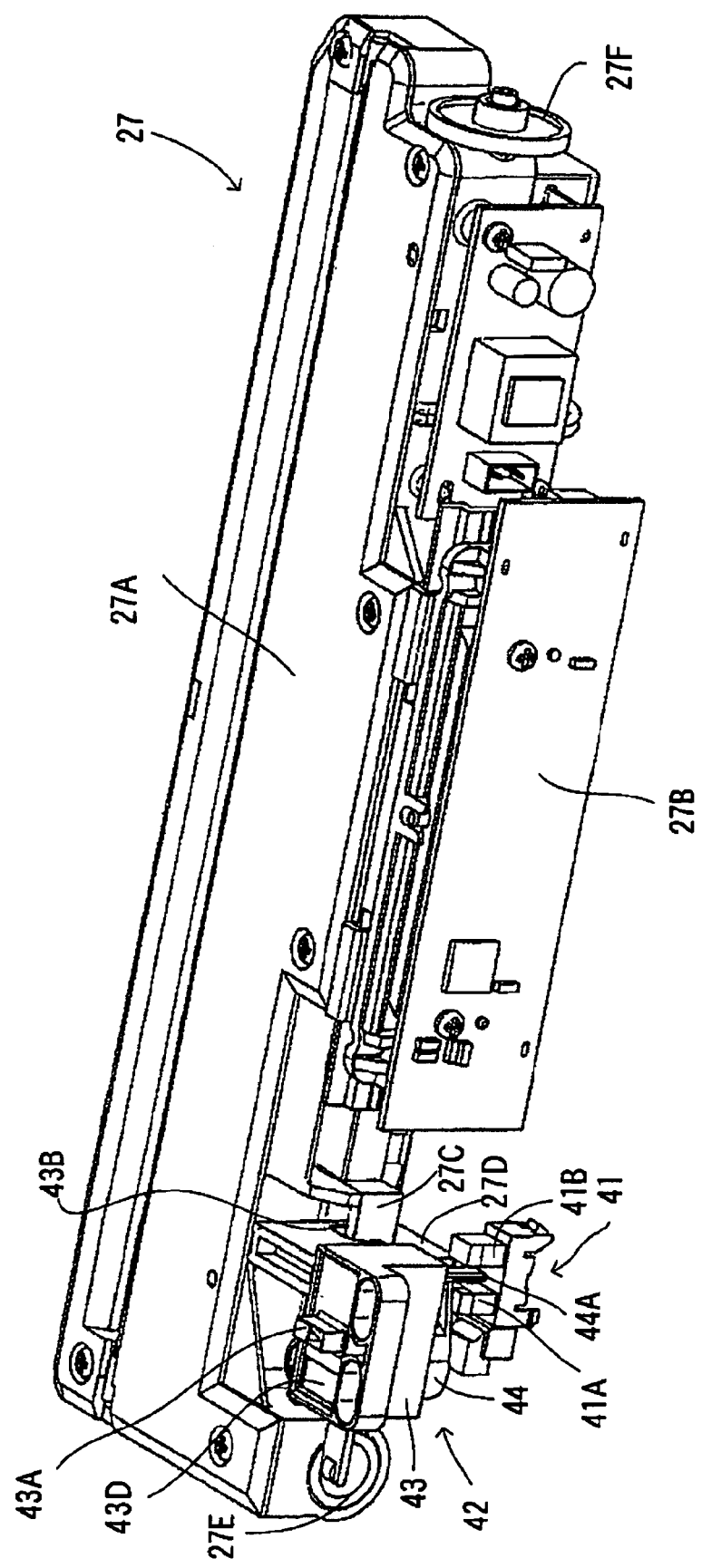
FIG. 3 is a perspective view representing a fixed state of a CCD unit.

Next, with reference to FIGS. 3 through 7, the CCD unit 27 and the unit fixing device 42 will be described. As shown in FIG. 3, the CCD unit 27 includes a main body 27A and a CCD substrate 27B. The main body 27A is provided with a hole 27E in one end thereof through which the guide shaft 28 is inserted, and the wheel 27F, for moving the CCD unit 27, at the other end thereof to be supported by the guide rail 32. The CCD unit 27 can move towards and away from the fixing device 42. Because the main body 27A is generally made of an engineering plastic, for example, commonly used engineering plastics are polybutyleneterephthalate, polyamide, polycarbonate, acrylonitrile-butadiene-styrene (ABS), or similar materials providing a high mechanical strength, reinforced by glass fibers or the like, abrasion resistance of the main body 27A is not low (and its sliding ability is not high). Further, the mechanical strength of the main body 27A is higher than a cover or the like. Therefore the main body 27A abrades a cover, or the like when sliding over the cover, or the like. In this embodiment, however, the wheel 27F is made of, for example, POM (resin polyacetate) which has a lubricative property. Therefore, even when the wheel 27F bumps into or rubs the shock absorbing protrusion 31B during transport, dust caused by abrasion is not generated, which results in reducing the generation of dust in the multi-functional apparatus 1.

When the multi-functional apparatus 1 is transported, it is inevitable that shocks (impacts) are applied to the apparatus 1. In such a case, it may be expected that the CCD unit 27 moves up and down in the apparatus 1 and bumps into the surroundings, such as the maintenance cover 31 and platen glass 26. However, in the embodiment, because the diameter of the wheel 27F is larger than the thickness of the main body 27A of the CCD unit 27 and the CCD substrate 27B, it is the wheel 27F that always bumps into the surrounding, such as the maintenance cover 31, and the CCD unit 27 does not bump into anything even if the CCD unit 27 moves up and down.

A CCD 52 (not shown in FIG. 3, see FIG. 8) is provided inside the main body 27A. The CCD 52 is electrically connected to a control device 51 (not shown in FIG. 3, see FIG. 8) and to the CCD substrate 27B. The main body 27A includes an engaging protrusion 27C to be engaged with the unit fixing device 42 and a detection board 27D to be detected by the position sensor 41.

Figure 4A:
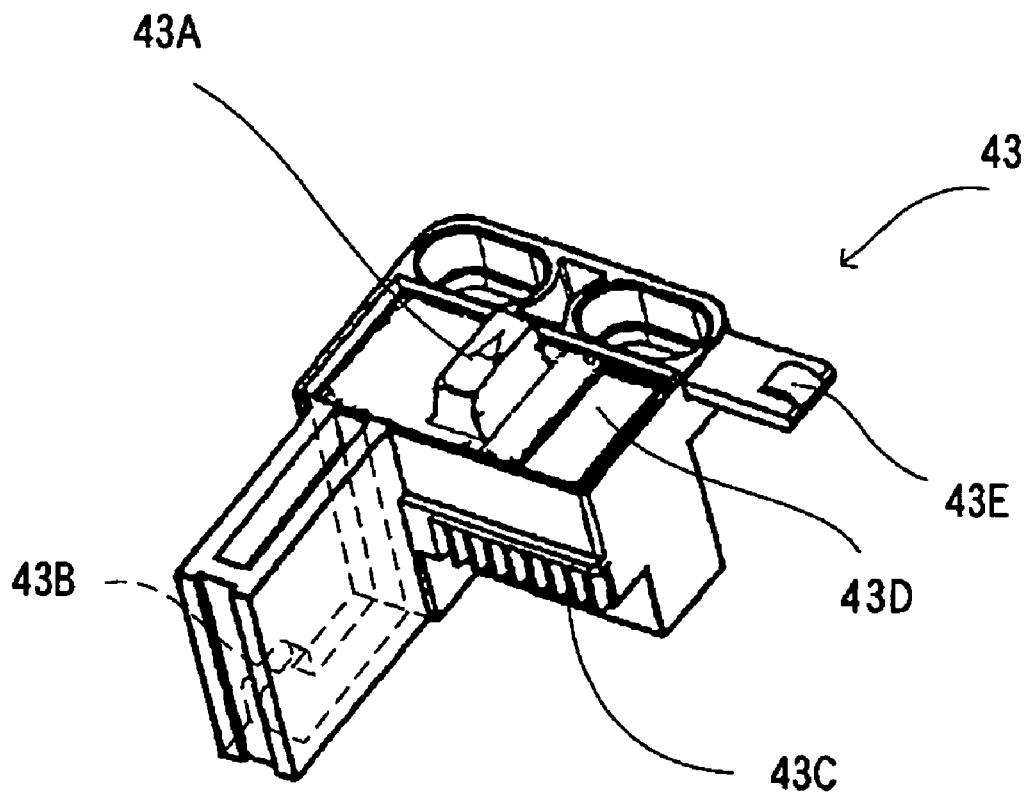
FIGS. 4(A) and 4(B) are perspective views of parts composing the unit fixing device.
Figure 4B:
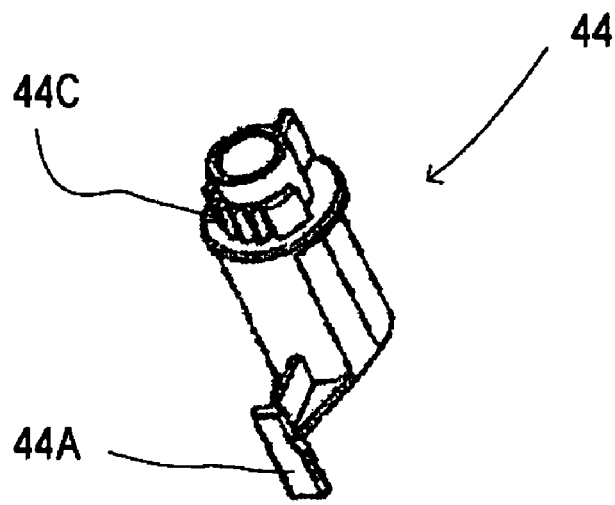
Figure 5:
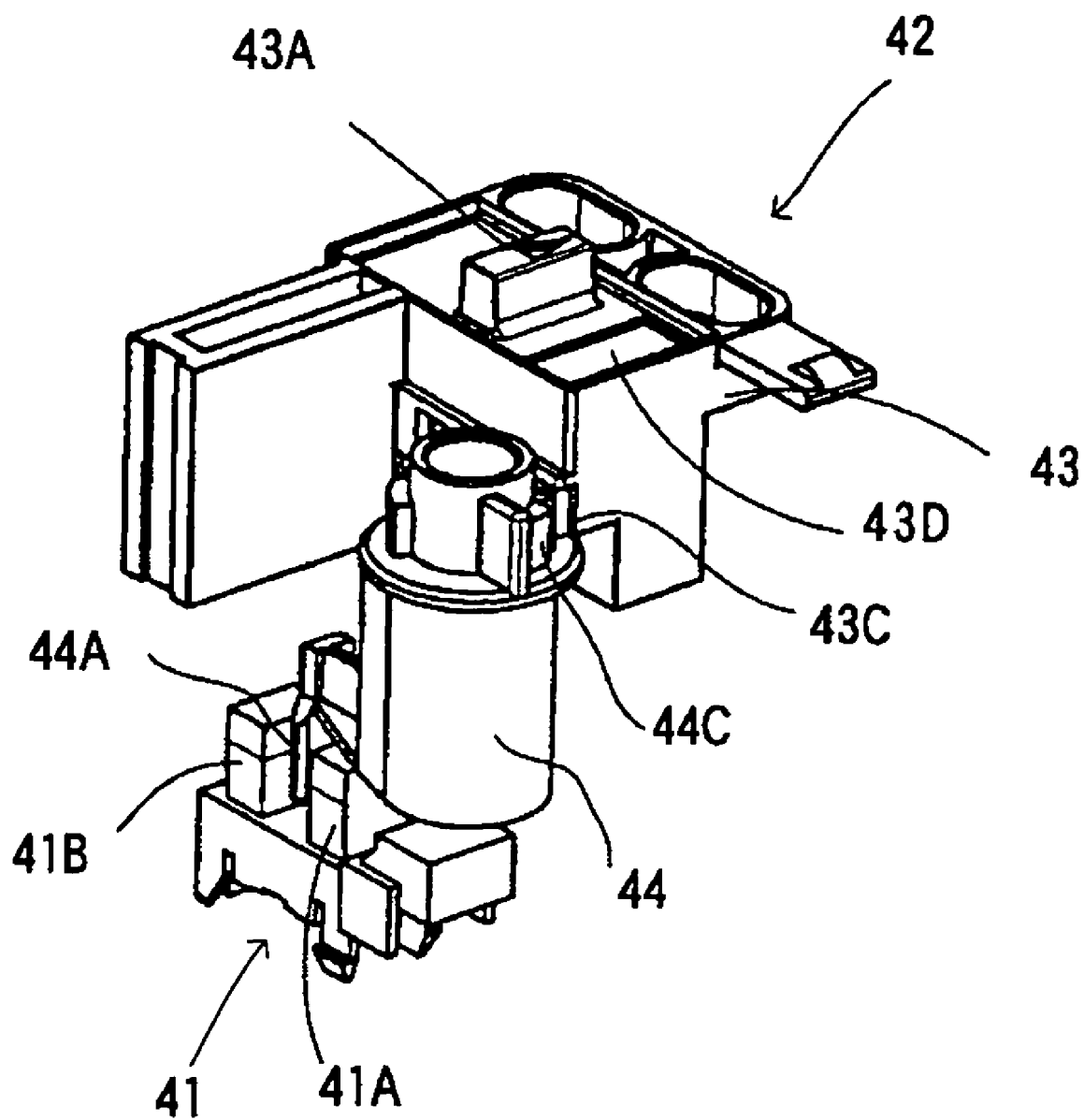
FIG. 5 is a perspective view of the parts of the unit fixing device in a fixed state from a different view point.

As shown in FIGS. 3 through 5, the unit fixing device 42 has a substantially L-shape when viewed from above. The unit fixing device 42 includes a sliding portion 43 that is switchable between a locking position and an unlocking position by changing its position substantially in a lateral direction, that is, a direction substantially parallel to a direction along which a long side of the main body 27A of the CCD unit 27 is aligned. The unit fixing device 42 also includes a rotating portion 44 which is substantially cylindrical. By engaging a rack portion 43C of the sliding portion 43 with a pinion portion 44C of the rotating portion 44 (see FIGS. 4(A), 4(B) and 5), the rotating portion 44 can be rotated in accordance with the movement of the sliding portion 43. The sliding portion 43 is also made of POM, and therefore does not generate dust when sliding over the engaging protrusion 27C. A protrusion 43E (see FIG. 4(A)) can generate a click feeling by contacting and sliding over a bottom surface of the document base 24 when the sliding portion 43 slides.

The rotating portion 44 includes a detection protrusion 44A capable of moving to where the position sensor 41 can detect the detection protrusion 44A. The sliding portion 43 includes the operation portion 43A and an engaging groove 43B. The operation portion 43A is positioned inside the operation opening 24A, and the engaging groove 43B is capable of engaging with the engaging protrusion 27C.

Figure 6A:
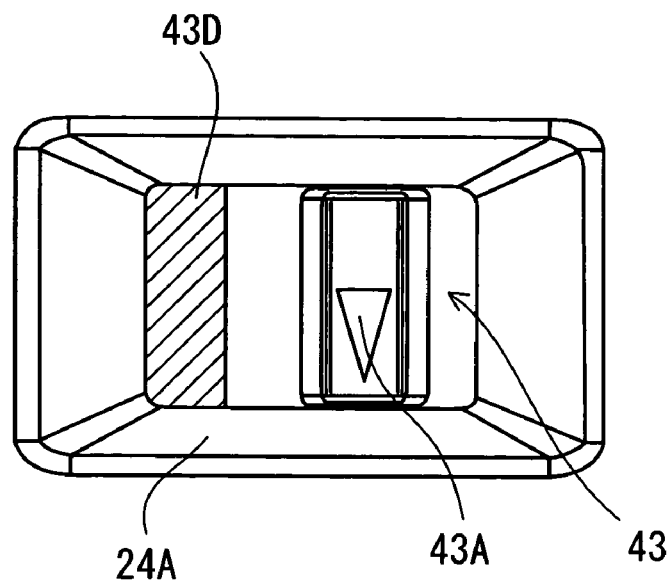
FIGS. 6(A) and 6(B) are plan views representing a positional relationship between an operation opening and an operation portion.
Figure 6B:
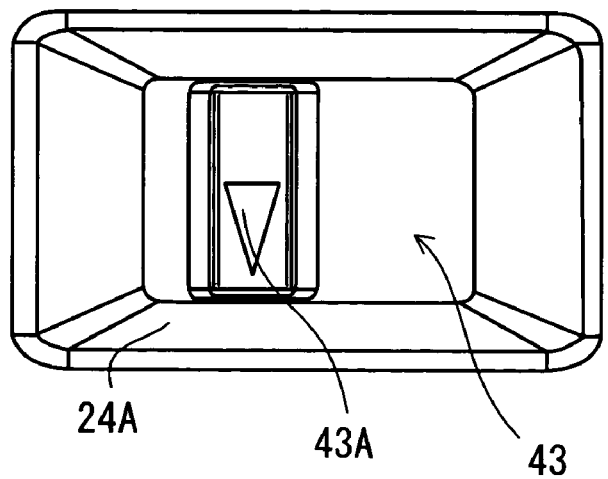

As shown in FIGS. 6(A) and 6(B), the operation portion 43A protrudes into the operation opening 24A. By changing the position of the operation portion 43A in a lateral direction of FIGS. 6(A) and 6(B), that is, in a direction substantially parallel to a direction along which a long side of the operation opening 24A is aligned, users can switch the state of the CCD unit 27 between the locked state and the unlocked state.

In FIG. 6(A), the operation portion 43A is on the right side, which means that the CCD unit 27 is fixed or locked. In this fixed state, colored portion 43D, provided on an upper surface of the sliding portion 43 of the unit fixing device 42, can be seen through the operation opening 24A. Because the color of the colored portion 43D is highly visible color, such as red, users can easily recognize the fixed, or locked, state of the CCD unit 27.

On the other hand, in FIG. 6(B), the operation portion 43A is on the left side, which means that the CCD unit 27 is unfixed or unlocked. In this unfixed state, the colored portion 43D is not seen through the operation opening 24A, thus users can recognize the unfixed, or unlocked, state of the CCD unit 27.

The operation portion 43A is covered with the document base cover 15 when the document base cover 15 is closed, which prevents users from accidentally operating the operation portion 43A. The top surface of the operation portion 43A is flush with, or lower than, the top surface of the operation opening 24A. Therefore, because the top surface of the operation portion 43A does not protrude from the top surface of the operation opening 24A, users can not move the operation portion 43A accidentally. In other words, users can not change the state of the CCD unit 27 between the fixed, or locked, state and the unfixed, or unlocked, state unintentionally.

The position sensor 41 is capable of alternatively detecting the detection board 27D of the CCD unit 27 and the detection protrusion 44A of the rotating portion 44 of the unit fixing device 42. The position sensor 41 includes a light emitting portion 41A having a LED (Light Emitting Diode) or the like, and a light receiving portion 41B having a photo-transistor or the like. As described above, the position sensor 41 is arranged fixedly inside the scanner 3 such that the position sensor 41 can alternatively detect detection board 27D of the CCD unit 27 and the detection protrusion 44A of the rotating portion 44 of the unit fixing device 42. By monitoring whether light emitted from the light emitting portion 41A to the light receiving portion 41B is interrupted, the position sensor detects the absence or the presence of the detection board 27D or the detection protrusion 44A. The detection sensor 41 does not detect the detection board 27D and the detection protrusion 44A simultaneously, but detects the one of the detection board 27D and the detection protrusion 44A when the other is removed from the detection position where the detection board 27D and the detection protrusion 44A are alternatively detected. Accordingly, the position sensor 41 can detect that the CCD unit 27 is in an initial position, and that the CCD unit 27 is in the fixed, or locked, state, fixed by the unit fixing device 42.

FIGS. 3 and 5 show a state where the CCD unit 27 is fixed, or locked, by unit fixing device 42. In FIG. 3, the sliding portion 43 is on the right side. Thereby, the engaging groove 43B is engaged with the engaging protrusion 27C. As a result, the CCD unit 27 is fixed, or locked, in a fixed position. In this state, the detection protrusion 44A of the rotating portion 44 is positioned where the position sensor 41 can detect the detection protrusion 44A.

Figure 7:
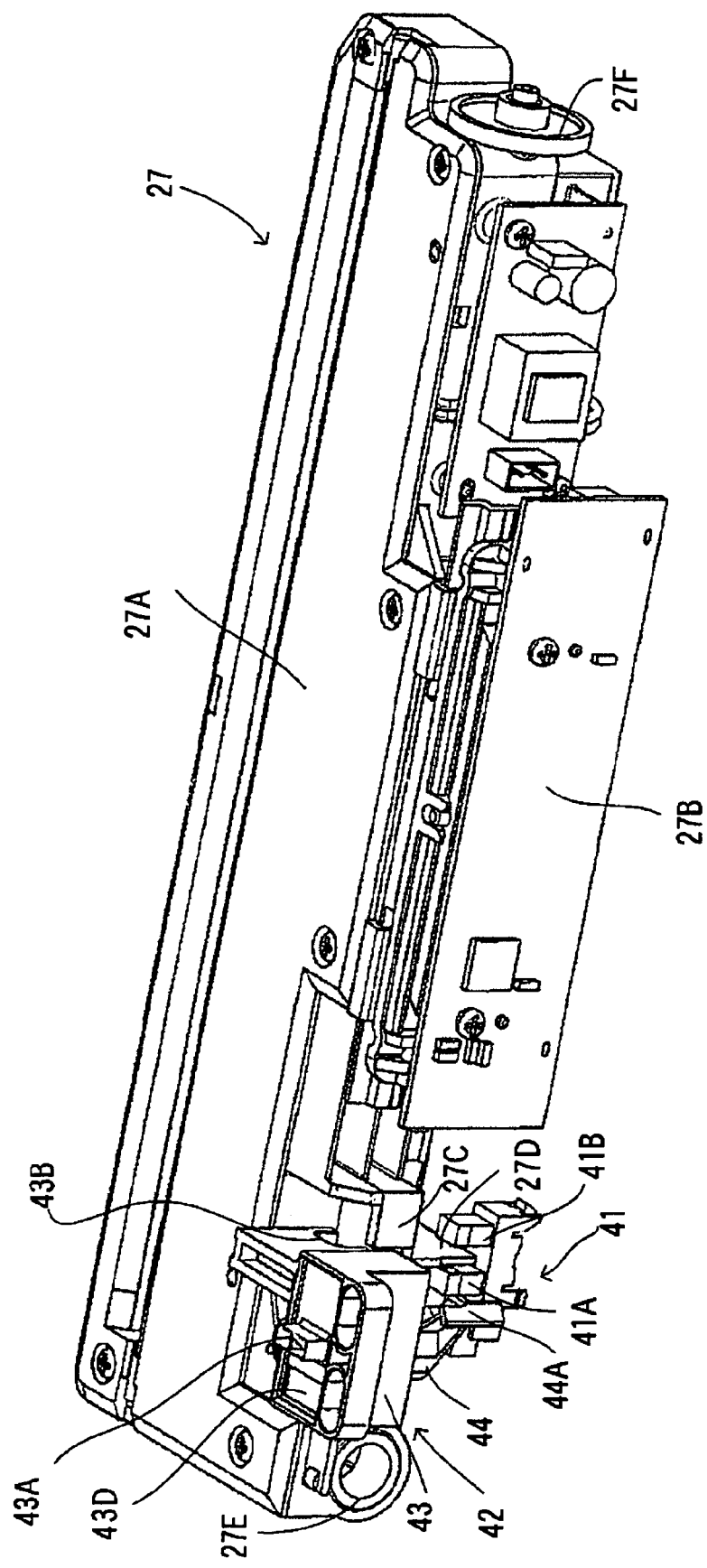
FIG. 7 is a perspective view representing an unfixed state of a CCD unit.

On the other hand, FIG. 7 shows a state where the CCD unit 27 is released from the unit fixing device 42. In FIG. 7, the sliding portion 43 of the unit fixing device 42 is on the left side. Thus, the engaging groove 43B is separated from the engaging protrusion 27C. As a result the CCD 27 can move freely. Because the detection protrusion 44A of the rotating portion 44 moves in accord with the movement of the sliding portion 43, the detection protrusion 44A is removed from the detection position. Also, in FIG. 7, the CCD unit 27 is in the initial position which is at one end of the region of the movement of the CCD unit 27. In this state, the detection board 27D is positioned where the position sensor 41 can detect the detection board 27D.

Figure 8:
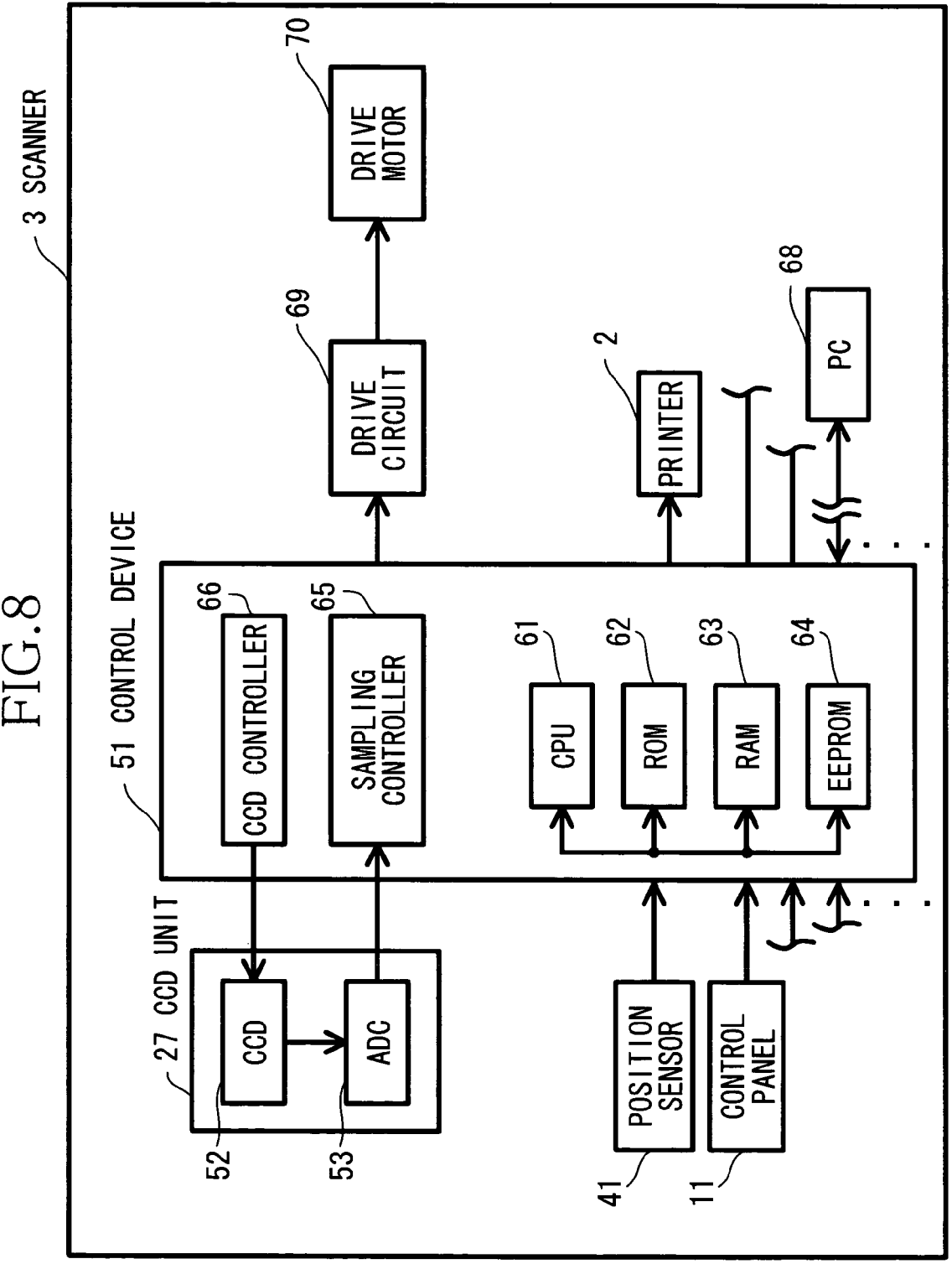
FIG. 8 is a block diagram of a scanner.

Next, the control device 51 which controls the scanner 3 will be described with reference to FIG. 8. FIG. 8 is a block diagram of the scanner 3. As shown in FIG. 8, the control device 51 provided in the scanner 3 includes a Central Processing Unit (CPU) 61, a Read Only Memory (ROM) 62, a Random Access Memory (RAM) 63, an Electrically Erasable Programmable Read Only Memory (EEPROM) 64, a sampling controller 65 and a CCD controller 66. The control device 51 is electrically connected to the CCD unit 27, the position sensor 41, a control panel 11, a drive circuit 69 for driving the drive motor 70, and the printer 2, or the like, and is capable of being connected to a host device, such as a Personal Computer (PC) 68. The CPU 61, the ROM 62, the RAM 63, and the EEPROM 64 comprise a microcomputer.

The CCD unit 27 includes the CCD 52 and an analogue-digital converter (ADC) 53, and is controlled by the control device 51. The CCD unit 27 thus structured inputs pixel signals read by the CCD 52 into the ADC 53, coverts the pixel signals into digital signals, and then inputs the digital signals into the sampling controller 65 of the control device 51. The sampling controller 65 deletes pixel data that need not be stored in the RAM 63 from among the pixel data input from the CCD unit 27, and stores the remaining pixel data into the RAM 63.

The CPU 61 sends a command to the CCD controller 66 based on detection information from the position sensor 41 or designations from the operation panel 11. When the CCD controller 66 receives the command from the CPU 61, the CCD controller 66 changes a mode of the movement of the CCD unit 27 or drives the CCD unit 27 by sending a signal to the drive circuit 69.

When the scanner 3 thus structured is transported, the CCD unit 27 needs to be fixed by the unit fixing device 42 because movement of the CCD unit 27 during transport may cause a problem when the scanner is used. On the other hand, if the CCD unit 27 is fixed by the unit fixing device 42 when the scanner is used, this may also cause a problem. Therefore it is preferable to set the CCD unit 27 to an initial state where the CCD unit 27 can read a document, according to the following initial setting procedure.

Figure 9:
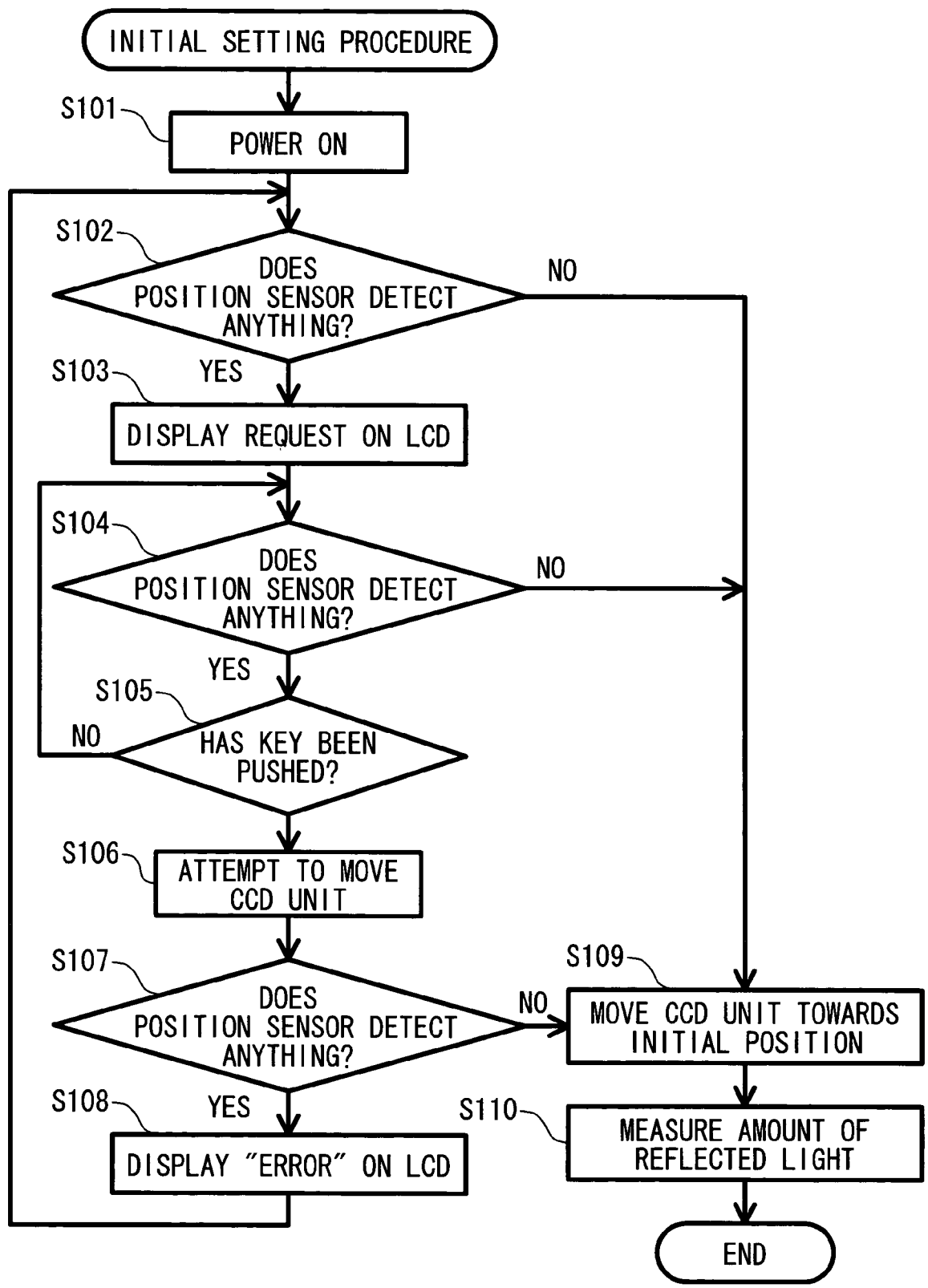
FIG. 9 is a flowchart representing an initial setting procedure to be executed by a control device.

FIG. 9 is a flowchart representing an initial setting procedure to be executed by the control device 51. When the multi-functional apparatus 1 is turned on in S101 of FIG. 9, the control device 51 judges whether either the detection board 27D or the detection protrusion 44A is detected by the position sensor 41 in S102. When either the detection board 27D or the detection protrusion 44A is detected, the flow proceeds to S103, otherwise, the flow proceeds to S109.

In S103, the control device 51 requests that the user unlock the CCD unit 27 and then push a key 11B by displaying, for example, "PLEASE RELEASE SCAN LOCK THEN PUSH ANY KEY" on the LCD 11A.

Next, in S104, the control device 51 again judges whether either the detection board 27D or the detection protrusion 44A is detected by the position sensor 41. When either the detection board 27D or the detection protrusion 44A is detected, the flow proceeds to S105, otherwise, the flow proceeds to S109. In S105 the control device 51 judges whether the user has pushed a key 11B. When it is judged that the user has pushed a key 11B, the flow proceeds to S106, otherwise, the flow returns to S104.

Next, in S106, the control device 51 attempts move the CCD unit 27 in a predetermined direction, or in a direction that the CCD unit 27 is moved away from the fixing device 42, by a predetermined distance (for example, 8 mm). Then, in S107, the control device 51 again judges either whether the detection board 27D or the detection protrusion 44A is detected by the position sensor 41. When either the detection board 27D or the detection protrusion 44A is detected, the flow proceeds to S108, otherwise, the flow proceeds to S109.

In S108, the control device 51 notifies the user of an erroneous condition by displaying, for example, "ERROR" on the LCD 11A, and then returns to S102. When either the detection board 27D or the detection protrusion 44A is not detected in S102, S104, or S107, the flow proceeds to S109. In S109, the control device 51 moves the CCD unit 27 towards the initial position and stops the CCD unit 27 when the position sensor 41 detects the detection board 27D. In this stage, the CCD unit 27 is in an initial position.

Next, in S110, the control device 51 measures the amount of the light reflected from the reference white board 76 (see FIG. 10(A)), stores the value of the amount into the RAM 74 as a reference value, and ends the procedure. After that, the control device 51 moves the CCD unit 27 to a waiting position, shown in FIG. 10(B), and waits for an initiation command of the reading movement.

To explain the initial position and the waiting position, FIGS. 10(A) and 10(B) show a perspective view of the inside of the scanner 3 seen from the front side of the multi-functional apparatus 1. FIG. 10(A) shows a state where the CCD unit 27 is in the initial position and the detection board 27D is detected by the position sensor 41. As described above, the reference white board 76 is provided on an underside of the maintenance cover 31. The measurement of the reflected light is performed when the CCD unit 27 is in the initial position as shown in FIG. 10(A) with its reflected light reading portion 75 being vertically below the reference white board 76. FIG. 10(B) shows a state where the CCD unit 27 is in the waiting position, which is located to the right of the initial position, and the detection board 27 is not detected by the position sensor 41. In the state as shown in FIG. 10(B), because the reflected light reading portion 75 is located to the right of the maintenance cover 31, and faces the platen glass 26, the CCD unit 27 can start reading. Moreover, the waiting position, as shown in FIG. 10(B), is equal to the fixed, or locked, position. Therefore the unit fixing device 42 fixes, or locks, the CCD unit 27 when the CCD unit 27 is in the waiting position. Because the waiting position is equal to the fixed position, it is possible to fix, or lock, the CCD unit 27 without special operations when the CCD unit 27 is in the waiting position. Therefore, the amount of movement of the CCD unit 27 to the fixed, or locked, position is reduced and the time needed for setting the CCD unit 27 to the fixed, or locked, state becomes shorter.

According to the apparatus (scanner 3), it can not be judged which of the fixed, or locked, state and the initial position of the CCD unit 27 is detected, therefore the CCD unit is set to the initial state where the CCD unit 27 can move by the initial setting procedure described above (FIG. 9). In this initial setting procedure, when the position sensor detects either the detection protrusion 44A or the detection board 27D in S102, the control device 51 requests that a user unfix, or unlock, the CCD unit 27 (in S103), or moves the CCD unit 27 (in S109). After that, when the control device 51 confirms that the position sensor does not detect either the detection protrusion 44A or the detection board 27D, which means the CCD unit 27 is not fixed, or locked, and not in the initial position, the control device 51 moves the CCD unit 27 to the initial position (in S109), measures the amount of reflected light (in S110), and ends the procedure.

The CCD unit 27 is thus set to the initial state where the CCD unit 27 can read a document. Also, in S107, it is expected that the position sensor 41 does not detect either the detection protrusion 44A or the detection board 27D because the CCD unit 27 has been moved in S106. However, it is also expected that the position sensor 41 detects the detection protrusion 44A in S107 if a user has failed to unfix, or unlock, the CCD unit 27 in spite of the request in S103 and therefore the CCD unit can not move in S106. Therefore, by displaying an error message when the either detection protrusion 44A or the detection board 27D is detected in S107, it is possible to surely set the CCD unit to the initial state where the CCD unit 27 can move.

Moreover, after an error message is displayed in S108, the flow returns to S102 in which the position sensor 41 detects whether the CCD unit is fixed, or locked. Therefore it is possible to surely set the CCD 27 unit to the initial state where the CCD unit 27 can move. In addition, after confirming that the CCD unit 27 is not in the initial position and not in the fixed, or locked, state based on a result of whether either detection board 27D or detection protrusion 44A is detected in S102, S104, or S107, by moving the CCD unit 27 to the initial position, the position sensor 41 can detect the detection board 27, and therefore it is possible to set the CCD unit 27 in the initial position. Based on the initial position, it is possible to set the CCD unit 27 to the initial state where the CCD unit 27 can move.

As described above, when the CCD unit 27 is fixed, or locked, by the unit fixing device 42, the detection protrusion 44A is detected by the position sensor 41. In other words, the position sensor 41 can detect the fixed, or locked, state of the CCD unit 27. The position sensor 41 can also detect the detection board of the CCD unit 27 when the CCD unit 27 is unfixed, or unlocked. Therefore, it is possible to reduce manufacturing costs in comparison with a case where two individual sensors are provided.

The unit fixing device 42 is provided with the sliding portion 43 that is movable linearly (to the left and right as viewed in FIGS. 6(A) and 6(B) and as substantially viewed in FIGS. 3 and 7), and the rotating portion 44 is rotatable in accordance with the movement of the sliding portion 43. Because the engaging groove 43B is formed in the sliding portion 43 and the detection protrusion 44A is arranged fixedly to the rotating portion 44, it is possible to easily shift the state of the CCD unit 27 between the fixed, or locked, state and the unfixed, or unlocked, state, and also possible to fix, to lock, the CCD unit 27 securely.

In addition, although the unit fixing device 42 is disposed in the direction that the CCD unit 27 moves, the sliding portion 43 is movable in a direction perpendicular to the direction that the CCD unit 27 moves (generally into and out of the page as shown in FIGS. 3 and 7). Therefore, the region needed for the unit fixing device 42 to move is reduced. More specifically, if the unit fixing device 42 is structured such that the unit fixing device 42 moves in a direction that the movable unit moves, length, which is the sum of the length that the lock mechanism moves and the length that the CCD unit, that is, the movable unit, moves, is needed. As a result, the size of the scanner 3 is reduced by the invention having the sliding portion 43 move perpendicular to the direction of movement of the CCD unit 27.

The detection protrusion 44A of the unit fixing device 42 moves to the detection position from a side opposite to the side from which the detection board 27D of the CCD unit 27 moves to the detection position. Therefore, when the detection board 27D approaches the position sensor 41, the region needed for the detection protrusion 44A to be removed from the detection position is reduced (see FIG. 7). As a result, the scanner 3 becomes smaller.

Moreover, because the position sensor 41 is an optical sensor including a light emitting device and the light receiving device, compared to other sensors, such as a mechanical sensor, the accuracy of the detection is higher, and the price is lower. Therefore it is possible to improve the detection ability at the same time that the manufacturing costs are reduced. Furthermore, with the scanner 3 of this embodiment, including the CCD unit 27, the unit fixing device 42, and the position sensor 41, it is possible to fix the CCD unit 27 securely and is also possible to detect the initial position and the fixed state of the CCD unit 27 using only one sensor 41. Therefore, it is possible to reduce manufacturing costs in comparison with a case where two sensors are provided.

Although an optical sensor is used as the position sensor 41 in this embodiment, the position sensor 41 is not limited to an optical sensor. For example, the position sensor 41 may be a mechanical sensor, which turns ON when contacted by either the detection board 27D or the detection protrusion 44A.

Also, even though the engaging groove 43B, capable of engaging with the engaging protrusion 27C of the CCD unit 27, is provided in the sliding portion 43, and the detection protrusion 44A capable of being detected by the position sensor 41 is provided on the rotating portion 44, the configuration of the unit fixing device 42 is not so limited. For example, the detection protrusion 44A may be provided on the sliding portion 43, and an engaging portion capable of engaging with the engaging protrusion 27C of the CCD unit 27 may be provided on the rotating portion 44. When the unit fixing device 42 is thus structured, it is also possible to fix the CCD unit 27 securely and to detect the initial position and the fixed state of the CCD unit 27 with the position sensor 41.

Next, a second embodiment of a multi-functional apparatus 4 to which the invention is applied, will be described with reference to FIGS. 11 and 12. The multi-functional apparatus 4 of this second embodiment substantially has the same structure as the multi-functional apparatus 1 of the first embodiment except that the shape of the CCD unit 27 and the unit fixing device 80 differ from those of the first embodiment. Accordingly, the same parts of the multi-functional apparatus 4 and the multi-functional apparatus 1 are designated by the same reference numerals and the explanation of those parts is substantially omitted.

As shown in FIG. 7, the CCD unit 27 has an engaging protrusion 27C protruding from the vicinity of the CCD board 27B towards the hole 27E. On the other hand, as shown in FIG. 11, the CCD unit 27 of this second embodiment has an engaging protrusion 27G protruding from the vicinity of the hole 27E towards the CCD board 27B.

A fixing device 80 of this embodiment includes a operation portion 80A to be positioned inside the operation opening 24A of the maintenance cover 31, a main body 80B being substantially cylindrical, an hook-shaped engaging portion 80C capable of engaging the engaging protrusion 27G formed on the CCD unit 27, and the detection protrusion 80D capable of moving to a detection position where the position sensor 41 can detect the detection protrusion 80D. The unit fixing device 80 is capable of rotating on the center axis of the main body 80B.

Figure 11:
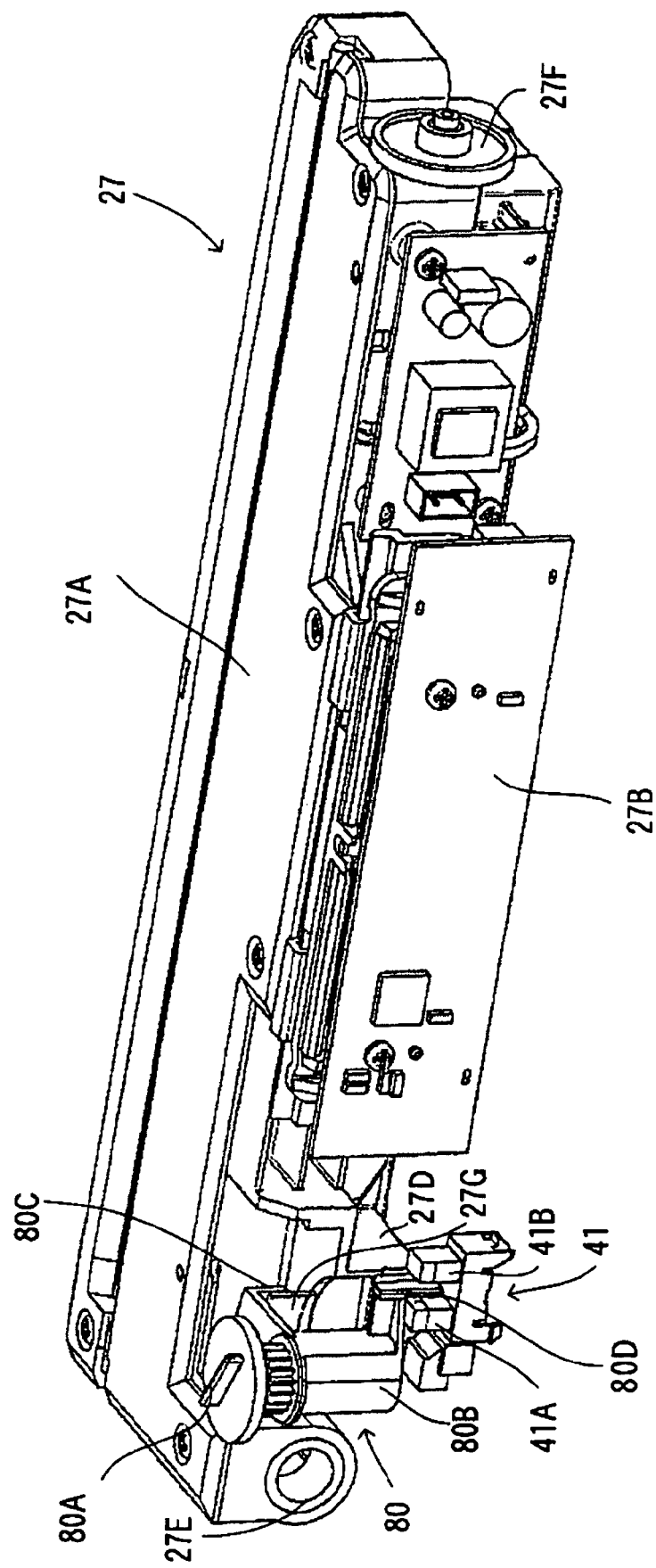
FIG. 11 is a perspective view representing a fixed state of a CCD unit.

FIG. 11 shows the state that the CCD unit 27 is fixed, or locked, by the unit fixing device 80. In FIG. 11, the engaging protrusion 27G of the CCD unit 27 is engaged with the engaging portion 80C of the unit fixing device 80, and the detection protrusion 80D is in the detection position where the position sensor can detect the detection protrusion 80D.

Figure 12:
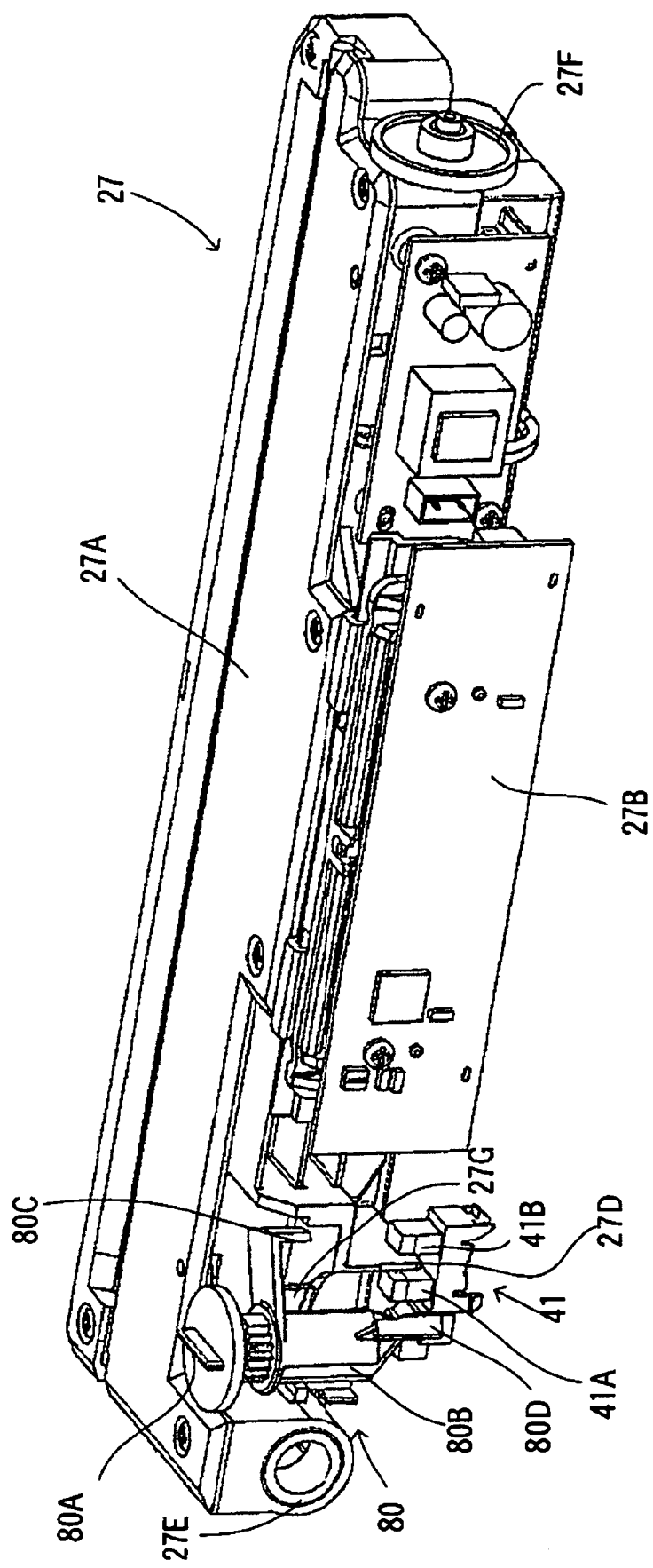
FIG. 12 is a perspective view representing an unfixed state of a CCD unit.

On the other hand, FIG. 12 shows that the state the CCD unit is unfixed, or unlocked. Compared with FIG. 11, in FIG. 12, the unit fixing device 80 has been rotated clockwise by about 60 degrees, when viewed from the top, the engaging portion 80C is separated from the engaging protrusion 27G, and the CCD unit 27 can move freely. The detection protrusion 80D is removed from the detection position, because the detection protrusion 80D moves in accordance with the movement of the main body 80B.

Also, in FIG. 12, the CCD unit 27 is in the initial position which is the one end of the region of the movement of the CCD unit 27. In this state, the detection board 27D is positioned where the position sensor 41 can detect the detection board 27D.

By thus structuring the scanner 3 (multi-functional apparatus 4) of the second embodiment, the manufacturing costs of the scanner 3 (multi-functional apparatus 4) can be reduced. Also, by operating the scanner 3 following the initial setting procedure shown in FIG. 9, it is possible to set the scanner 3 to the initial state where the scanner can read a document.

Furthermore, different from the unit fixing device 42 of the first embodiment, the unit fixing device 80 of this second embodiment has only the rotatable main body 80B. The engaging portion 80C and the detection protrusion 80D are integrally arranged on the main body 80B. Even when the unit fixing device 80 is thus structured, it is possible to shift easily the state of the CCD unit 27 between the fixed, or locked, state and the unfixed, or unlocked, state and to fix, or lock, the CCD unit 27 securely. Further, the scanner 3 of the second embodiment including the unit fixing device 80 which rotates, can be smaller than that of the first embodiment including the sliding portion 43 which moves linearly because the space needed for the rotation is much smaller than that needed for the linear movement. Moreover, the unit fixing device 80 of the second embodiment is structured integrally with only one part, therefore the manufacturing cost unit fixing device 80 is lower than that of the unit fixing device 42 of the first embodiment.

Although the engaging groove 43B capable of engaging with the engaging protrusion 27C of the CCD unit 27 is provided in the sliding portion 43, and the detection protrusion 44A capable of being detected by the position sensor 41 is provided on the rotating portion 44 in the first embodiment, all of the engaging groove, the engaging protrusion, and the detection protrusion can be provided on a rotatable main body.

Although the engaging portion 80C and the detection protrusion 80D are provided on the main body 80B in the second embodiment, a hook-shaped engaging portion can be provided on a sliding portion and a detection protrusion can be provided on a rotating portion.

Although the invention has been described in detail with reference to specific embodiments thereof, it would be apparent to those skilled in the art that various changes and modifications may be made therein without departing from the spirit of the invention.

What is claimed is:

1. An image reading apparatus, comprising:
    an image reading unit movably provided in the image reading apparatus, the image reading unit including an engaged portion;
    a locking mechanism locking the image reading unit, the locking mechanism including an engaging portion engaging with the engaged portion, and a first detected portion changing its position in accordance with the movement of the engaging portion;
    a position sensor detecting the image reading unit when the image reading unit is in a first position, the position sensor detecting the first detected portion when the engaging portion engages with the engaged portion;
    a document board that loads the document to be read;
    a supporting member that supports the document board;
    a document base cover that covers the upper surface of the document board and the supporting member; and
    an operation portion formed on the lock mechanism for operating the lock mechanism, the operation portion being provided in the upper surface of the supporting member.

2. The image reading apparatus according to claim 1, wherein a waiting position where the image reading unit starts reading is close to a fixed position where the engaging portion engages with the engaged portion.

3. The image reading apparatus according to claim 2, wherein the waiting position is the fixed position.

4. The image reading apparatus according to claim 3, wherein the first position is separated from the fixed position towards the position sensor.

5. The image reading apparatus according to claim 3, wherein the first position is the fixed position.

6. The image reading apparatus according to claim 1, wherein a top surface of the operation portion is flush with or lower than a top surface of the supporting member.

7. A method for detecting a fixed state of a movable unit with a position sensor and setting the movable unit to an initial state where the movable unit can move, the movable unit having a lock mechanism and being provided movably in the apparatus, the lock mechanism fixing the movable unit in a fixed position, and having a first detected portion that changes its position in accordance with the fixing movement of the lock mechanism, the position sensor comprising means for detecting the movable unit when the movable unit is in a first position that is different from the fixed position and detecting the first detected portion when the movable unit is fixed in the fixed position, the method comprising:
    a first step of judging whether either the movable unit or the first detected portion is detected by the position sensor;
    a second step of notifying that the movable unit should be unfixed by the lock mechanism when it is determined in the first step that one of the first movable unit and the first detected portion is detected by the position sensor;
    a third step of judging whether either the movable unit or the first detected portion is detected by the position sensor after the notification in the second step;
    a fourth step of judging whether a command to move the movable unit is received when it is determined in the third step that one of the movable unit and the first detected portion is detected by the position sensor;
    a fifth step of moving the movable unit when it is determined in the fourth step that the command is received; and
    a sixth step of judging whether one of the movable unit and the first detected portion is detected by the position sensor after moving the movable unit in the fifth step wherein the third step and the fourth step are alternately repeated when it is determined in the third step that one of the movable unit and the first detected portion is detected by the position sensor and when it is determined in the fourth step that the command is not received, and the movable unit is initialized when it is determined that one of the movable unit and the first detected portion is not detected by the position sensor in the first step, the third step, or the sixth step.

8. The method according to claim 7, further comprising a seventh step of notifying an error when it is determined in the sixth step that one of the movable unit and the first detected portion is detected by the position sensor.

9. The method according to claim 8, wherein the second step is executed after the error is notified in the seventh step.

10. The method according to claim 7, wherein the movable unit is moved to the first position when it is determined in the first step that one of the movable unit and the first detected portion is not detected by the position sensor.

11. The method according to claim 7, wherein the movable unit is moved to the first position when it is determined in the third step that one of the movable unit and the first detected portion is not detected by the position sensor.

12. The method according to claim 7, wherein the movable unit is moved to the first position when it is determined in the sixth step that one of the movable unit and the first detected portion is not detected by the position sensor.

13. An apparatus, comprising:
a movable unit being movable relative to the apparatus;
a first protrusion provided on the movable unit;
a board provided on the movable unit;
a lock mechanism that fixes the movable unit;
an operation member provided on the lock mechanism, the operation member moving between a locking position and an unlocking position;
a groove provided in the lock mechanism, the groove receiving the first protrusion when the movable unit is in a fixed position and when the groove moves in accordance with the movement of the operation member from the unlocking position to the locking position;
a second protrusion provided on the lock mechanism, the second protrusion moving in accordance with the movement of the operation member; and
a sensor that detects the second protrusion when the operation member is in the locking position and detects the board when the movable unit is in a position different from the fixed position.

14. The apparatus according to claim 13, wherein the lock mechanism further comprises a main body being movable linearly and a rotation portion rotating in accordance with the linear movement of the main body, wherein the groove is provided in the main body, the operation portion is provided on the main body, and the second protrusion is provided on the rotation portion, wherein the locking position is one end of a linear movement region of the operation portion and the unlocking position is the other end of the region.

15. The apparatus according to claim 13, wherein the lock mechanism further comprises a main body capable of rotation, wherein the groove is provided in the main body and the operation portion and the second protrusion are provided on the main body, wherein the locking position is one end of the rotation of the operation portion and the unlocking position is the other end of the rotation of the operation portion.

16. An apparatus, comprising:
a movable unit being movable relative to the apparatus; the movable unit including:
a first protrusion provided on the movable unit;
a board provided on the movable unit; and
a lock mechanism that fixes the movable unit, the lock mechanism including:
an operation member provided on the lock mechanism, the operation member moving between a locking position and an unlocking position; and
a hook-shaped engaging portion on the lock mechanism, the hook shaped engaging portion hooking the first protrusion when the movable unit is in a fixed position and when the hook-shaped engaging portion moves in accordance with the movement of the operation member from the unlocking position to the locking position;
a second protrusion provided on the lock mechanism, the second protrusion moving in accordance with the movement of the operation member; and
a sensor that detects the second protrusion when the operation member is in the locking position and detects the board when the movable unit is in a position different from the fixed position.

17. The apparatus according to claim 16, wherein the lock mechanism further comprises a main body movable linearly and a rotation portion rotating in accordance with the linear movement of the main body, wherein the hook-shaped engaging portion and the operation portion are provided on the main body, and the second protrusion is provided on the rotation portion, wherein the locking position is one end of an area where the operation portion moves linearly and the unlocking position is the other end of the area.

18. The apparatus according to claim 16, wherein the lock mechanism further comprises a rotatable main body, wherein the hook-shaped engaging portion, the operation portion, and the second protrusion are provided on the main body, and the locking position is one end of the rotation of the operation portion and the unlocking position is the other end of the rotation of the operation portion.

* * * * *